United States Patent [19]
McBride et al.

[11] Patent Number: 5,189,869
[45] Date of Patent: Mar. 2, 1993

[54] POWER WASHER FOR ROTARY MOWERS

[76] Inventors: Roby C. McBride, Rte. 2; Roger A. McBride, Rte. 1, Box 396 B, both of Limestone, Tenn. 37681

[21] Appl. No.: 784,555

[22] Filed: Oct. 29, 1991

Related U.S. Application Data

[63] Continuation-in-part of Ser. No. 564,775, Aug. 9, 1990, Pat. No. 5,094,066.

[51] Int. Cl.⁵ ............... A01D 34/64; A01D 34/66; A01D 34/82; A01D 55/00
[52] U.S. Cl. .................. 56/17.5; 56/295; 56/320.1; 56/DIG. 20
[58] Field of Search ............ 56/295, 255, 320.1, 56/320.2, 17.5, 16.8, DIG. 20

[56] References Cited

U.S. PATENT DOCUMENTS

| | | | |
|---|---|---|---|
| 2,936,563 | 5/1960 | Blume | 56/320.2 X |
| 2,984,061 | 5/1961 | Stabnu | 56/320.1 |
| 2,992,524 | 7/1961 | Stabnu | 56/320.1 |
| 3,040,990 | 6/1962 | Gotti | 56/DIG. 5 X |
| 3,214,893 | 11/1965 | Griffin | 56/320.2 |
| 3,535,862 | 10/1970 | Wittner | 56/17.5 |
| 3,601,960 | 8/1971 | Buechler | 56/295 X |
| 3,648,446 | 3/1972 | Haapoja et al. | 56/320.2 |
| 4,926,622 | 5/1990 | McKee | 56/16.8 |

Primary Examiner—Stephen J. Novosad

[57] ABSTRACT

A rotary blade mowing machine having mechanism for washing the inner walls of the blade shroud thereof, wherein the shroud has a top deck and surrounding skirt depending therefrom to provide a blade cavity, wherein one or more drive shafts are provided within the cavity and at least one of which carries a rotary blade, at least one fluid slinger having a body provided with diverters extending generally radially outwardly therefrom, the slinger being affixed at its body to at least one of the shafts within the cavity at a position spaced from the cavity side of the deck, the diverters having surfaces on their cavity side contoured with respect to the general plane of the cavity side of the deck to provide at least one generally vertically oriented vector surface and, at least one chute surface having a fluid throw axis directed generally radially outwardly toward the skirt, the vector surface and the chute surface being adapted to direct, respectively, contacting wash fluid generally toward the deck and generally toward the skirt upon rotation of the at least one shaft, and at least one wash fluid port in the deck adapted to direct wash fluid onto the cavity side of the slinger or slingers.

9 Claims, 4 Drawing Sheets

POWER WASHER FOR ROTARY MOWERS

This application is a continuation-in-part of Ser. No. 07/564,775 filed Aug. 9, 1990, now U.S. Pat. No. 5,094,066.

BACKGROUND OF THE INVENTION

1. Field of Invention

This invention concerns rotary mowing machines, both riding and walking types, having either single or multiple blades, typically employed to cut grass, weeds, brush or other vegetation, wherein, according to the present invention, washing means is provided to power water streams onto the inner walls of the blade shroud to wash away wet, loose vege wash away clumps of dried grass or dirt, or other such debris which are typically formed on said inner walls and which typically are very difficult and inconvenient to remove, particulary from heavy riding mowers, the undersides of which are practically inaccessible.

2. Description of Related Art

Heretofore, washing devices for rotary mowers have been of the type which injects water into the mower blade cavity onto the blade or into the vicinity of the blade whereby the blade is expected to throw the water against the debris and wash it away. It has been found however, that the mower blade essentially atomizes the water and merely wets down much of the debris, especially where the debris has already hardened onto the underside of the cavity deck. Devices of this type are disclosed in U.S. Pat. Nos. 2,936,563; 2,984,061; 2,992,524; 3,040,990; 3,214,893; 3,535,862; and 3,648,446, the disclosure of which concerning general rotary mower structure and wash water inlet mechanisims to the mower blade cavity, useful in practising the present invention, are incorporated herein by reference.

OBJECTS OF THE INVENTION

Objects therefore of the present invention are: to provide a washing device for rotary mowers which is easy to use and highly effective in washing away loose or difficult, hard packed mowing debris from the inner walls of the blade shroud; to provide such device for walking or riding mowers of either the single or multiple blade types; to provide such device, in certain embodiments, as modifications of the mower blade itself; and to provide such device which is readily mountable on conventional mowers without any significant structural modification thereof.

SUMMARY OF THE INVENTION

The above and other objects hereinafter appearing have been attained in accordance with the present invention which is defined in an operative mowing machine embodiment as comprising a rotary blade mowing machine having mechanism for washing the inner wall means of the blade shroud thereof, wherein the shroud has top deck means and surrounding skirt means depending therefrom providing blade cavity means, wherein one or more drive shafts are provided within said cavity means and at least one of which carries a rotary blade, at least one of said drive shafts being provided with fluid slinger means spaced from the cavity side of said deck means, said slinger means having body means provided with diverter means positioned generally radially outwardly thereon, said diverter means having surface means on its cavity side contoured with respect to the general plane of the cavity side of said deck means to provide at least one generally vertically oriented vector surface means, said diverter means also being provided with at least one chute surface means having a fluid throw axis directed generally radially outwardly toward said skirt means, said vector surface means and said chute surface means being adapted to direct, respectively, contacting wash fluid generally toward said deck means and generally toward said skirt means upon rotation of said slinger means, and wash fluid port means in said deck means adapted to direct wash fluid onto the cavity side of said slinger means.

In certain preferred embodiments:

(a) the diverter means comprises substantially equally radially and circumferentially spaced segments, at least one of which has the vertically oriented vector surface means thereon which is inclined toward the cavity side of the shroud deck to direct wash fluid thereagainst, and at least another of which is provided with said chute surface means to direct wash fluid against said skirt means;

(b) a wash fluid reservoir is provided on the mower and adapted to be fluid connected to the port means by valve means; and (c) collector wall means are provided on the diverter means upstream of the vector surface means and the chute surface means for containing wash fluid and directing it to each surface means for enhancing the fluid jet power therefrom.

BRIEF DESCRIPTION OF THE DRAWINGS

Further objects and advantages of the invention will become apparent from the following description and drawings which are not made to scale and wherein.

Figure 1:
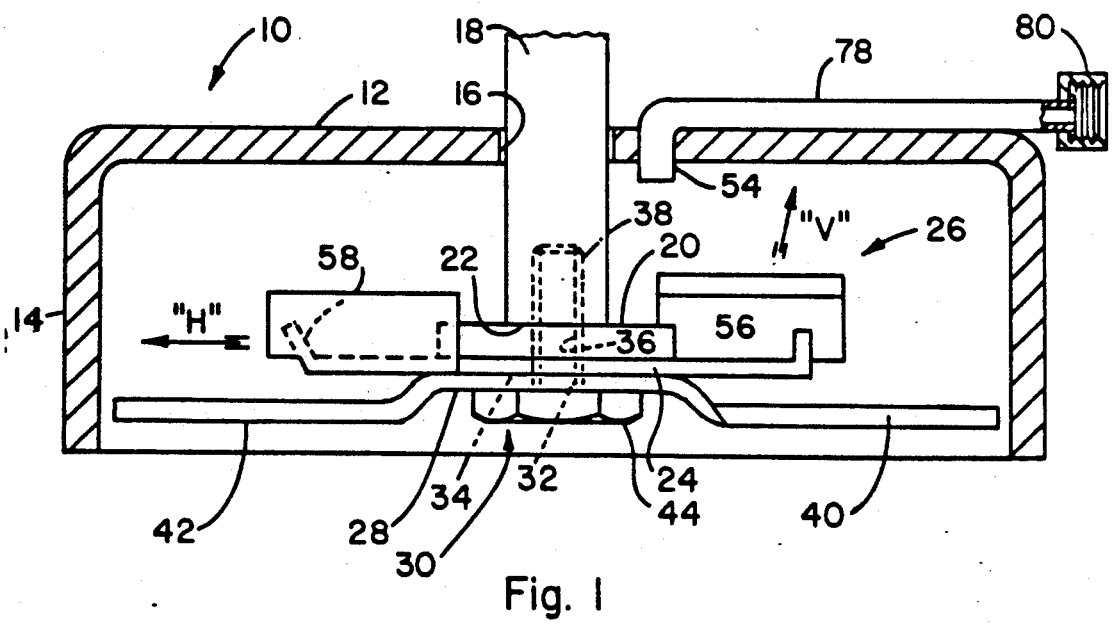
FIG. 1 is a cross-sectional side view of the blade shroud portion of a typical rotary mower showing one embodiment of the fluid slinger means.

Referring to the drawings, a mower blade housing generally designated 10 comprises a top deck 12 and a depending surrounding skirt 14, the deck being provided with drive shaft aperture 16 rotatably accommodating drive shaft 18. This shaft is typically either an extension of the motor crankshaft or is provided with a belt pulley or chain sprocket which is driven by the motor power unit or by another motor, either of which may be mounted in a location other than directly on the shroud deck. The shroud may have different shapes than shown, e.g., the skirt can be shorter or slanted or curved, which shapes are common to the art.

A heavy washer such as 20 may be positioned on the end 22 of the shaft to help support the body portion 24 of the present slinger generally designated 26, and the mower blade trunk 28 in cooperation with bolt 30 passing through apertures 32, 34 and 36 in the blade, slinger body and washer respectively and threaded at 38 into the shaft. The blade is provided with cutting segments 40 and 42 and the trunk 28 is preferably indented as shown to minimize contact of the bolt head 44 with the ground or other objects.

Figure 3:
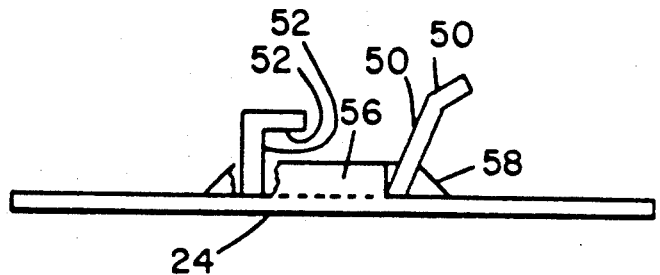
FIG. 3 is a side view, with portions broken away, of the slinger of FIG. 2 taken in the direction of the arrow "3"

The slinger is provided with any convenient number of radially spaced segments or diverter means of any of a variety of shapes such as 46 and 48 preferably integrally formed with body portion 24, at least one of which segments is provided with at least one generally vertically oriented vector surface means such as 50 and another segment with at least one chute surface means such as 52, each of which is shown in FIG. 3 as having two differently angled portions, but which, e.g., could also simply be curved to consist of one surface portion. The slinger may be in the form of a disc to which the diverter surfaces 50 and 52 can be affixed by spot welding or the like.

The function of the generally vertically oriented vector surfaces 50 is to direct portions of wash fluid, usually tap water, coming from inlet or port means 54 in deck 12 onto the upper surfaces of body portion 24, in generally vertically directed streams or jets "V" toward the deck without atomizing the fluid. The chute surfaces means 52 redirect portions of the fluid spouted onto the aforesaid upper surfaces of 24 in generally horizontal directions "H" toward the shroud skirt.

Figure 2:
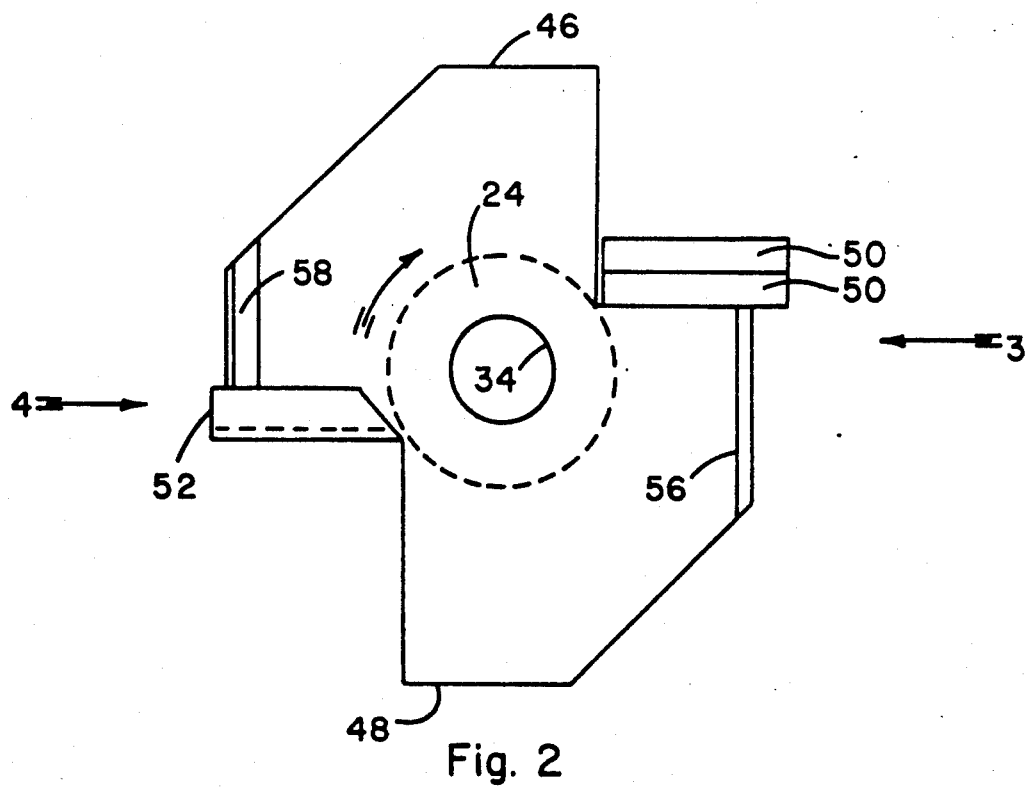
FIG. 2 is top elevational view of the slinger means of FIG. 1.

Referring to FIGS. 1-3, additional directing surfaces such as walls 56 and 58 may be provided to assist in providing adequate vertical and horizontal fluid jetting, and also to impart, where necessary, a more upward direction to the otherwise generally horizontal jet such as to direct the same toward the corner areas 59 of the housing. Also, collector wall means 61 may be provided upstream of the fluid directing surfaces 50 and 58 to at least partially contain the wash fluid and aid in ensuring that any adequate supply thereof will be presented to the directing surfaces.

Figure 4:
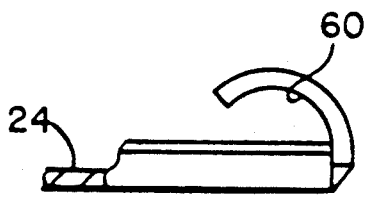
FIG. 4 is an end view of a slinger means showing a variation in the chute surface means as viewed in the direction of arrow "4" in FIG. 2.
Figure 5:
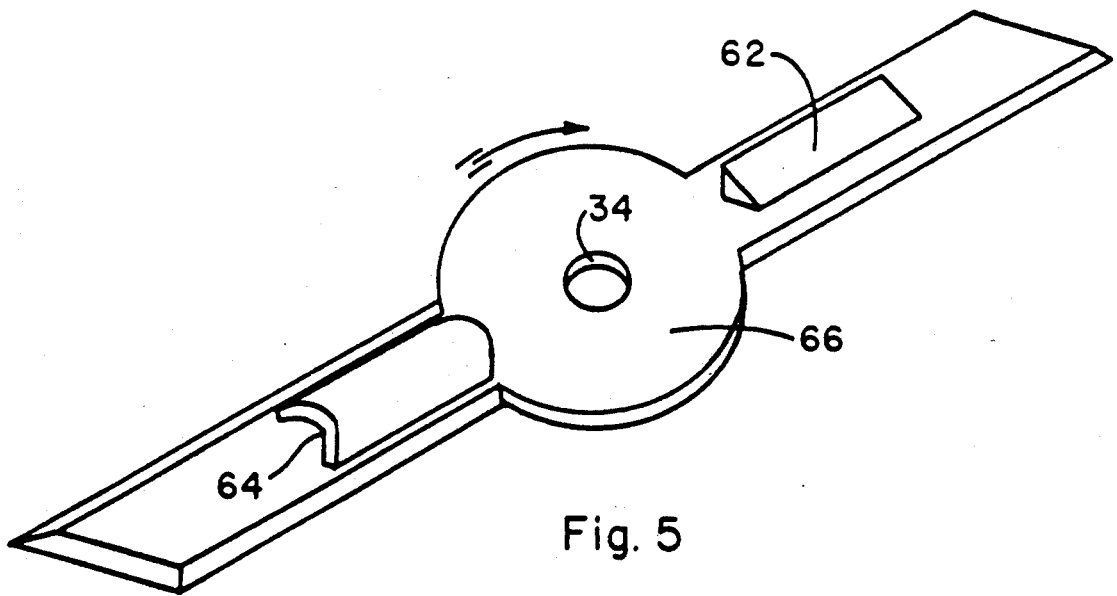
FIG. 5 is a perspective view of a conventional rotary mower blade modified with a variation of the present slinger integrally formed therewith or affixed thereto.
Figure 7:
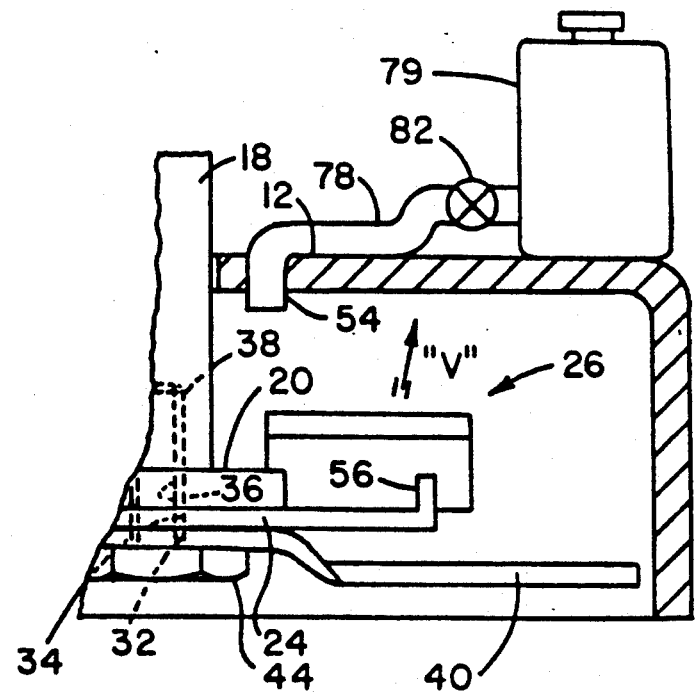
FIG. 7 is a view as in FIG. 1 showing a typical wash fluid reservoir which may be mounted on the mower housing deck for washing at a location remote from a wash fluid source.
Figure 12:
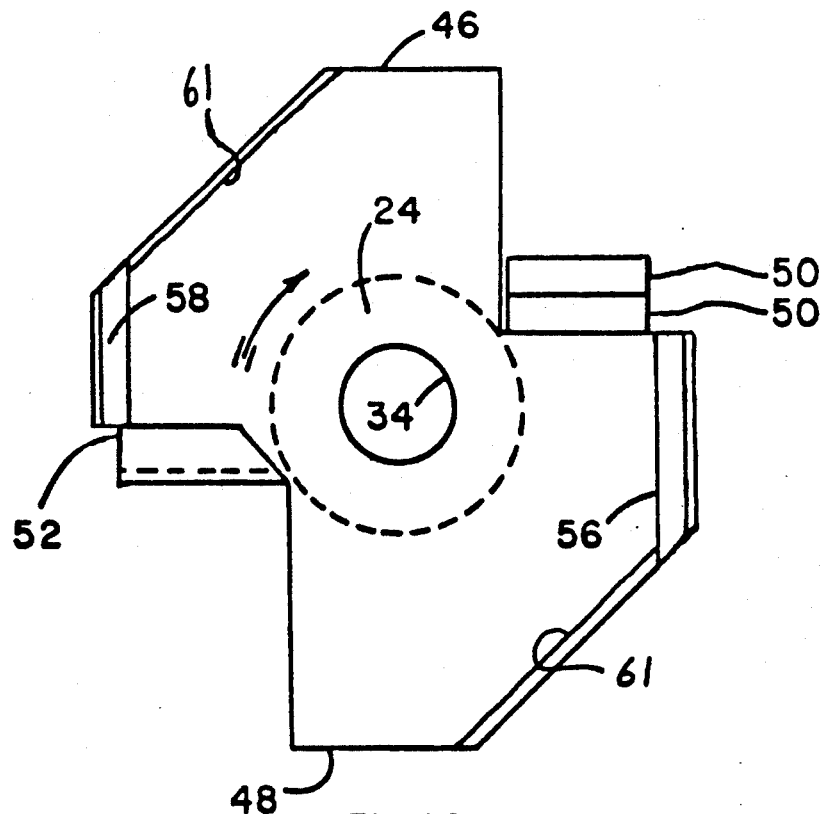
FIG. 12 is a view as in FIG. 2, showing the provision of collector wall means thereon and shorter chute means and vector surface means.

As shown in FIGS. 4 and 5, the chute surface 60 is given an arcuate cross-section to illustrate the variety of diverter configurations which may be employed. The slinger of FIGS. 1-3 is shown in a configuration which allows it to be stamped and formed readily from a piece of sheet metal such as 16 gauge galvanized steel or the like.

The embodiment of FIG. 5 is illustrative of a conventional mower blade having a generally vertically oriented surface 62 and an arcuate chute surface 64 provided by metal segments welded to the blade. In order to give a greater initial splash surface 66 for receiving fluid from inlet 54, the trunk portion of the blade may be enlarged as shown in the drawing, or a separate enlarged body piece equivalent to 24 could be mounted on top of the trunk portion 28 of the blade.

Figure 6:
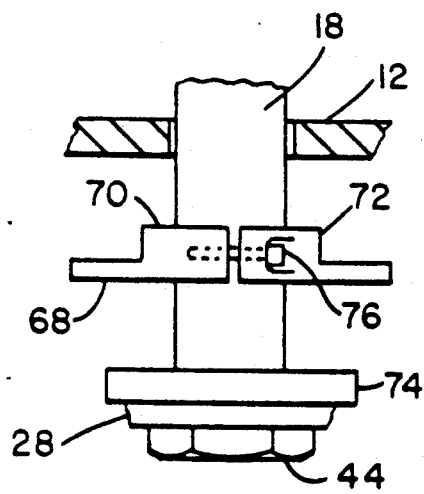
FIG. 6 is a side view of the washing device mounted on a headed drive shaft above the blade by a split collar.

In the embodiment of FIG. 6, the slinger body 68 is split in half and provided with split collar segments 70 and 72 such that where the shaft has a permanently affixed outer blade mounting bearing 74, the slinger can still be mounted in any position on the shaft simply by tightening collar screws 76 positioned on opposite peripheral sides of the collar. Where bearing 74 is not permanently affixed to the shaft, a conventional set screw collar may be employed to affix the slinger to any portion of the shaft.

In the operation of the washing device shown in FIGS. 1-6, a conventional garden hose is connected to fluid inlet conduit 78 at hose fitting 80 in conventional manner and water run onto the slinger, usually for about one or two minutes. The slinger is rotated by the mower motor in a clockwise direction as shown in the drawings. It is noted that several inlets such as 54 may be provided and connected into conduit 78. The slinger throws or jets the water in solid or near solid streams against the shroud with a force many times that achieved by water thrown by the mower blade itself, which blade tends to atomize rather than redirect the fluid flow and which is essentially incapable of providing significant fluid jetting against the shroud skirt. Alternatively, inlet 54 and conduit 78 may be connected into a reservior 79 of any convenient size and configuration attached in any suitable manner, such as welding, to deck 12. A manually controlled valve 82 may be employed in conduit 78 to regulate wash fluid flow to port 54.

Figure 8:
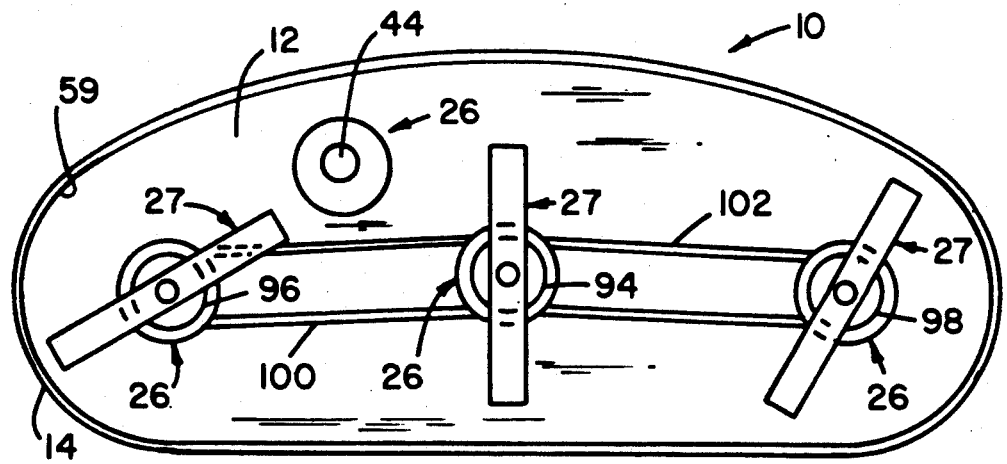
FIG. 8 is an elevational view of a multiple blade and slinger mechanism embodiment of the present invention as viewed from the bottom of the blade housing.
Figure 9:
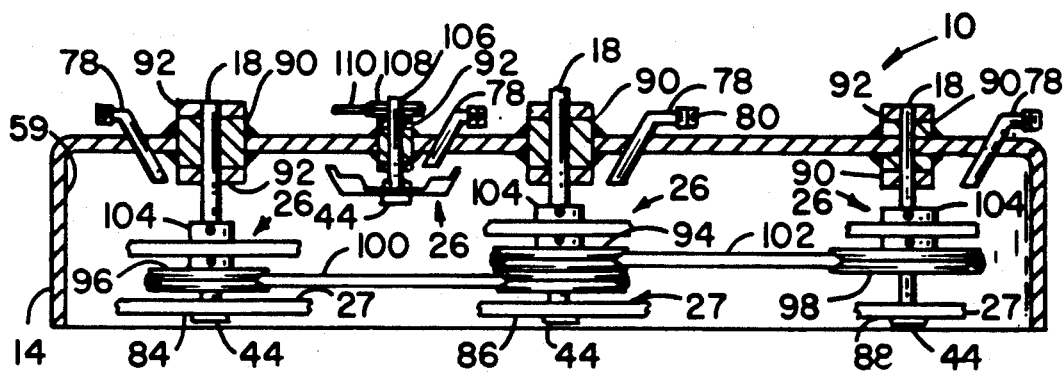
FIG. 9 is a cross-sectional view of the embodiment of FIG. 8 in an upright, operative position.

Referring to FIGS. 8 and 9 wherein the numbering of identical or equivalent structure is the same unless otherwise characterized, the mower is provided with three blades 84, 86 and 88, preferably the middle one 86 of which is driven by the mower motor. The drive shaft 18 for these blades preferably are mounted in bearing means 90 welded or otherwise affixed to deck 12 and are held in vertical position by lock collar 92 or other such means.

In the preferred embodiment, middle shaft 18 is provided with a double belt pulley 94 which drives the outboard shaft pulleys 96 and 98 through belts 100 and 102 respectively. Any of the shafts however can be the one driven by the mower power unit. Slingers 26 are affixed, e.g., by set screw mounting collars 104 to the shafts.

As shown in the embodiment of FIGS. 8 and 9, one or more of the slingers may be provided, alternatively or supplementally, on separate drive shafts such as 106 which preferably are drive by any means such as pulley 108 and belt 110 from the mower power unit. In this embodiment, the slingers can be strategically positioned as necessary.

Figure 10:
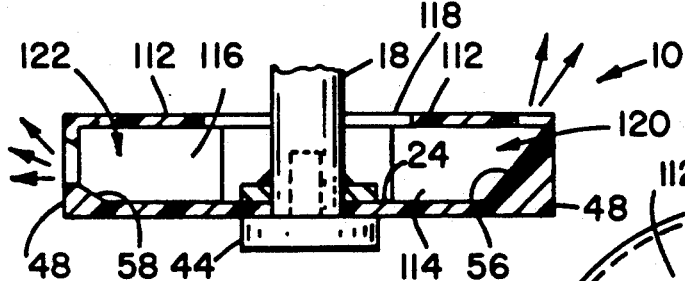
FIG. 10 is a partically sectioned, reduced dimension side view of a variation of the slinger means of FIGS. 1-7.
Figure 11:
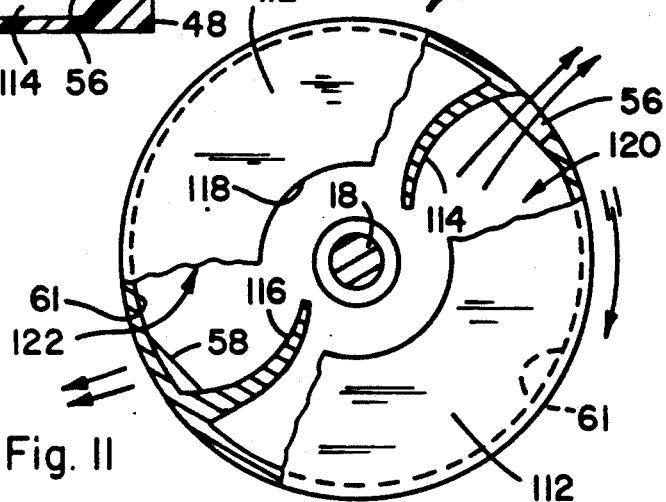
FIG. 11 is a top view of the slinger means of FIG. 10 with portions of the top wall means thereof broken away for clarity.

Referring to FIGS. 10 and 11, the slinger is shown as a molded plastic unit, which also may be of cast metal or other material, and provides, in addition to the aforesaid fluid directing surfaces and chute means, collector wall means 61, upper containment wall means 112, and jet enhancing vane means 114 and 116. It is noted that any number of directing surfaces 56 and 58, and jet enhancing vanes may be provided. In the operation of this embodiment, the wash fluid which is directed through the central opening 118 and strikes the slinger body is guided in the arcuate channels 120 and 122 and accelerated toward the directing surfaces 56 and 58 respectively, as enhanced by vanes 114 and 116, to produce powerful jets of the wash fluid.

Where multiple slingers are employed, the inlet conduits 78 may all be connected into a single plenum which is in turn connectable to a supply hose. Also, suitable valving may be provided, e.g., on the plenum, to control wash fluid flow to each slinger as desired.

The invention has been described in detail with particular reference to preferred embodiments thereof, but it will be understood that variations and modifications will be effected within the spirit and scope of the invention.

I claim:

1. A rotary blade mowing machine having mechanism for washing the inner wall means of the blade shroud thereof, wherein the shroud has top deck means and surrounding skirt means depending therefrom providing blade cavity means, wherein one or more drive shafts are provided within said cavity means and at least one of which carries a rotary blade, at least one of said drive shafts being provided with fluid slinger means spaced from the cavity side of said deck means, said slinger means having body means provided with diverter means positioned generally radially outwardly thereon, said diverter means having surface means on its cavity side contoured with respect to the general plane of the cavity side of said deck means to provide at least one generally vertically oriented vector surface means, said diverter means also being provided with at least one chute surface means having a fluid throw axis directed generally radially outwardly toward said skirt means, said vector surface means and said chute surface means being adapted to direct, respectively, contacting wash fluid generally toward said deck means and generally toward said skirt means upon rotation of said slinger means, and wash fluid port means in said deck means adapted to direct wash fluid onto the cavity side of said slinger means.

2. The device of claim 1 wherein said diverter means comprises segments substantially equally radially and circumferentially spaced on said body means, at least one of which segments has said substantially vertically oriented vector surface means thereon which is inclined toward the cavity side of the shroud deck for directing wash fluid thereagainst, and at least one of which segments has said chute surface means thereon for directing wash fluid against said skirt means.

3. The device of claim 1 wherein a wash fluid reservoir is provided on the mower and adapted to be fluid connected to said port means by valve means.

4. The device of claim 1 wherein collector wall means are provided on said diverter means upstream of each of said vector surface means and said chute surface means for containing wash fluid and directing it to each said surface means for enhancing the fluid jet power therefrom.

5. A wash-fluid slinger device adapted for association with and rotation by a drive shaft of a rotary blade mowing machine for washing the inner wall of the blade shroud thereof, wherein the shroud has a top deck and surrounding skirt depending therefrom providing a blade cavity, wherein one or more drive shafts are provided within the cavity and at least one of which carries a rotary blade, said slinger device having body means, diverter means associated with said body means and located generally radially outwardly thereon, said diverter means having at least one upper surface portion contoured to provide at least one vector surface means adapted for generally vertical orientation with respect to the general plane of the cavity side of the deck, said diverter means also being provided with at least one chute surface means adapted for orientation within the blade cavity such that its fluid throw axis is directed generally radially outwardly toward the skirt, said vector surface means and said chute surface means being adapted to direct, respectively, contacting wash fluid generally toward the deck and generally toward the skirt upon rotation of the drive shaft with which said device is associated.

6. The device of claim 5 wherein said diverter means comprises substantially equally radially and circumferentially spaced segments on said body means, at least one of which segments carries a substantially vertically oriented vector surface means thereon which is adapted for inclination toward the cavity side of the shroud deck for directing wash fluid thereagainst, and at least one of which segments carries a chute surface means thereon for directing wash fluid against the shroud skirt.

7. The device of claim 5 wherein collector wall means are provided on said diverter means upstream of each of said vector surface means and said chute surface means for containing wash fluid and directing it to each said surface means for enhancing the fluid jet power therefrom.

8. The device of claim 5 wherein said body means, vector surface means and chute surface means thereof are affixed to or integrally formed on the cavity side of a mower blade.

9. The machine of claim 1 wherein said port means comprises quick connect and disconnect coupling means adapted for use with a wash fluid source hose.

* * * * *